US011069256B2

(12) United States Patent
Chen et al.

(10) Patent No.: US 11,069,256 B2
(45) Date of Patent: Jul. 20, 2021

(54) INTERACTIVE CRAFTING ELECTRONIC TOY SYSTEM

(71) Applicant: Flycatcher Corp LTD., London (GB)

(72) Inventors: Shay Chen, Hod Hasharon (IL); Shachar Limor, Givat Shapira (IL)

(73) Assignee: Flycatcher Corp LTD, London (GB)

( * ) Notice: Subject to any disclaimer, the term of this patent is extended or adjusted under 35 U.S.C. 154(b) by 297 days.

(21) Appl. No.: 16/047,107

(22) Filed: Jul. 27, 2018

(65) Prior Publication Data

US 2019/0043383 A1  Feb. 7, 2019

Related U.S. Application Data

(60) Provisional application No. 62/540,697, filed on Aug. 3, 2017, provisional application No. 62/623,572, filed on Jan. 30, 2018.

(51) Int. Cl.
  *G09B 19/00* (2006.01)
  *G09B 5/06* (2006.01)
  (Continued)

(52) U.S. Cl.
  CPC ............ *G09B 19/00* (2013.01); *A63F 9/0073* (2013.01); *A63F 9/06* (2013.01); *A63F 9/24* (2013.01); *A63H 33/042* (2013.01); *G09B 5/06* (2013.01); *A63F 2009/1292* (2013.01); *A63F 2009/247* (2013.01); *A63F 2009/2442* (2013.01);
  (Continued)

(58) Field of Classification Search
  CPC ........ G09B 19/00; G09B 19/19; G09B 19/10; G09B 19/20; G09B 5/06; A63F 9/00; A63F 9/0073; A63F 9/06; A63F 9/24; A63F 2009/1292; A63F 2009/2442; A63F 2009/2457; A63F 2009/247; A63F 2011/0083; A63H 33/042; A63H 2200/00; A63H 33/04

See application file for complete search history.

(56) References Cited

U.S. PATENT DOCUMENTS

| 2002/0196250 A1 | 12/2002 | Anderson et al. |
| 2013/0217295 A1 | 8/2013 | Karunaratne |
| 2014/0257557 A1 | 9/2014 | Kraegeloh et al. |

FOREIGN PATENT DOCUMENTS

WO  2016/099260  6/2016

OTHER PUBLICATIONS

Extended European Search Report dated Nov. 2, 2018.

*Primary Examiner* — Timothy A Musselman
(74) *Attorney, Agent, or Firm* — Michael J. Feigin, Esq.; Feigin and Fridman LLC

(57) ABSTRACT

A crafting system for guiding a user in creating a craft, includes a crafting challenge repository storing a plurality of crafting challenges. The challenges each include instructions for creating a specific craft. A display surface can display the crafting challenges thereon. A controller includes instructions to receive a selection of a selected crafting challenge to be displayed on the display surface, and instructions to prepare a selected challenge for display on the display surface and to provide the prepared challenge to the display surface for display thereon. The controller is accommodated in a housing. At least one at least partially transparent crafting surface, may be removably mounted above the display surface such that when instructions of the prepared challenge are displayed on the display surface, the instructions are visible to the user through the crafting surface.

20 Claims, 8 Drawing Sheets

(51) Int. Cl.
*A63F 9/00* (2006.01)
*A63H 33/04* (2006.01)
*A63F 9/06* (2006.01)
*A63F 9/24* (2006.01)
*G09B 19/10* (2006.01)
*G09B 19/20* (2006.01)
*A63F 9/12* (2006.01)
*A63F 11/00* (2006.01)

(52) U.S. Cl.
CPC ........... *A63F 2009/2457* (2013.01); *A63F 2009/2464* (2013.01); *A63F 2011/0083* (2013.01); *A63F 2250/50* (2013.01); *A63H 2200/00* (2013.01); *G09B 19/10* (2013.01); *G09B 19/20* (2013.01)

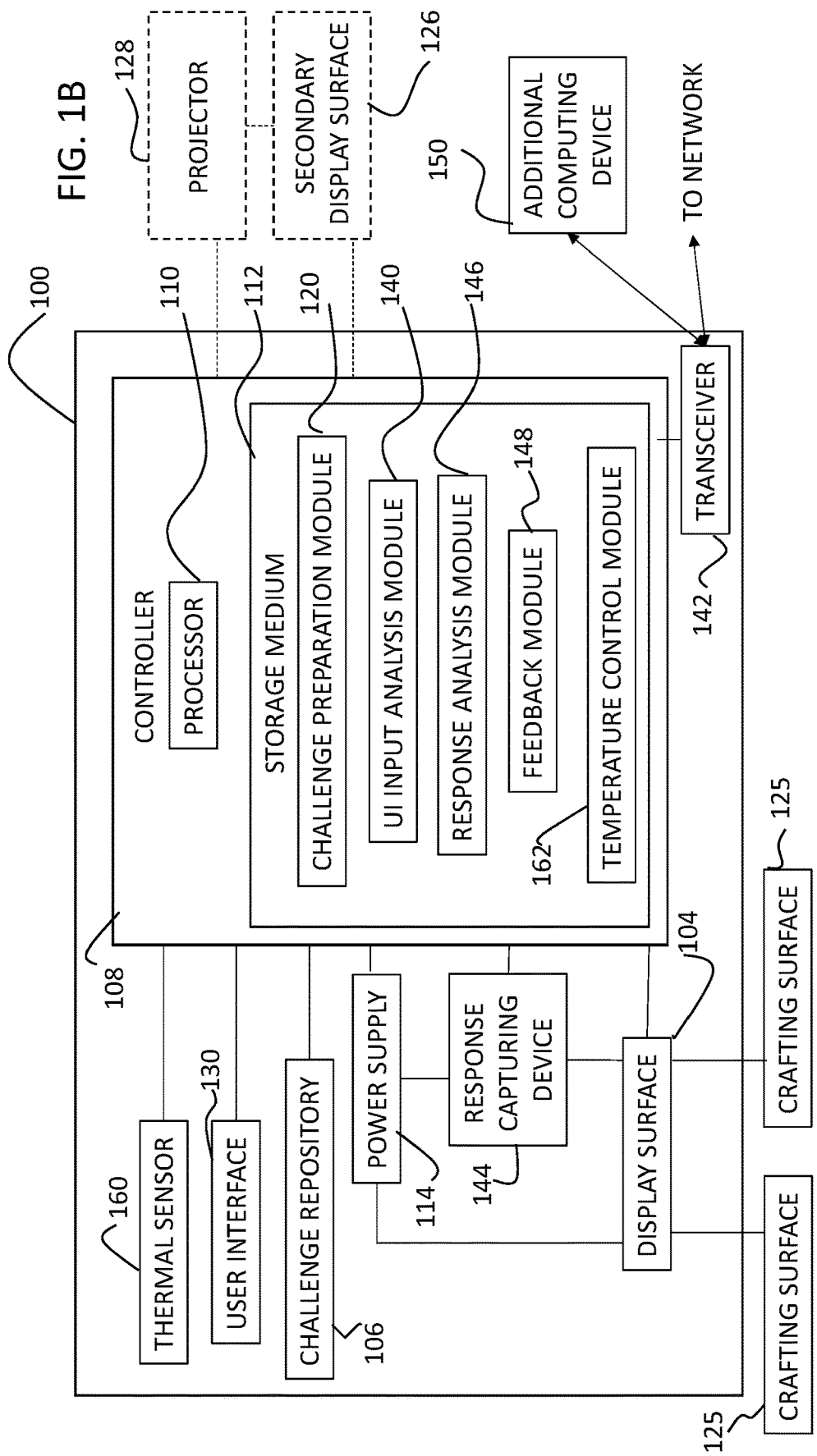

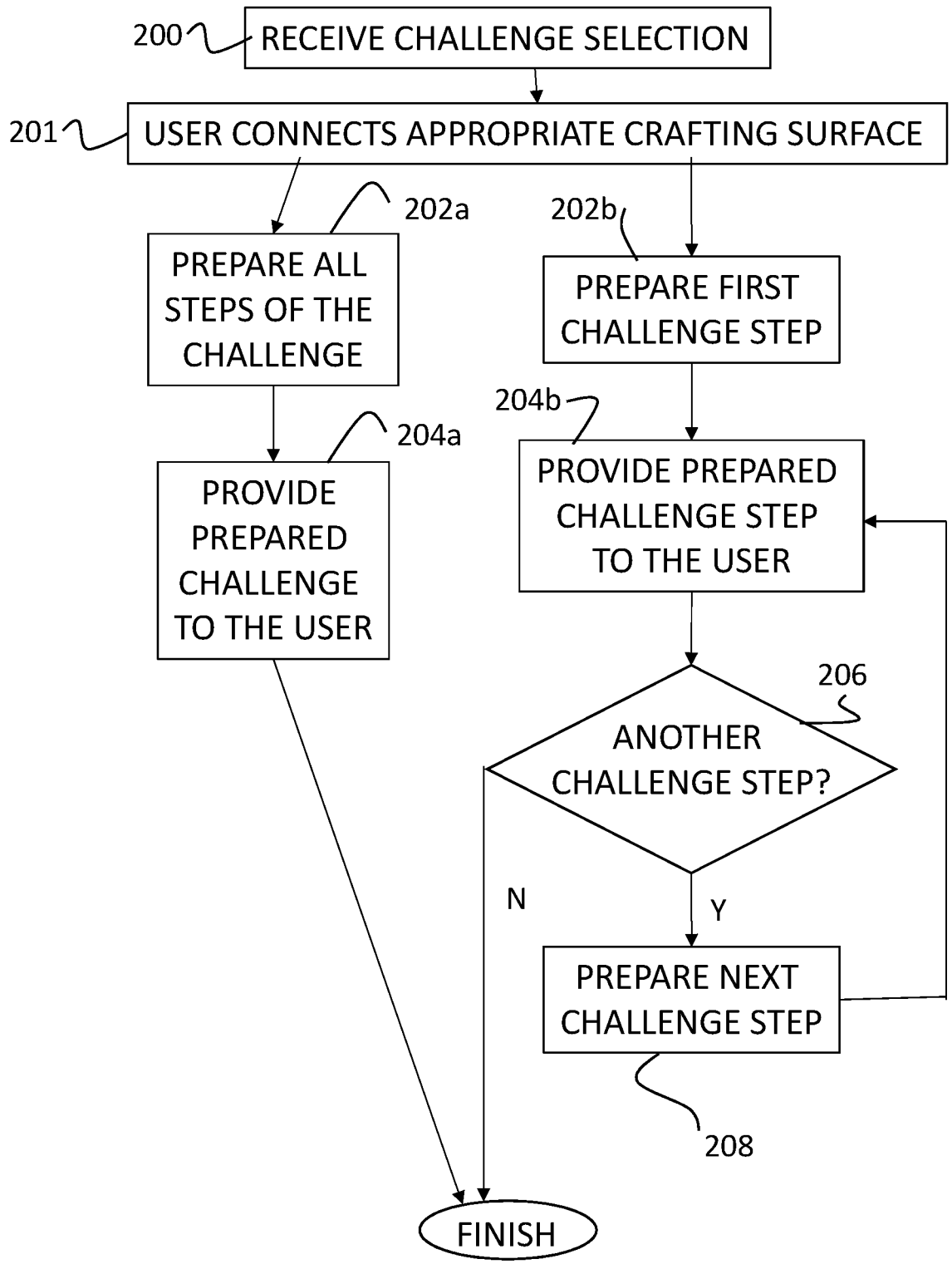

INTERACTIVE CRAFTING ELECTRONIC TOY SYSTEM

FIELD OF THE INVENTION

The invention, in some embodiments, relates to the field of electronic toys, and more specifically to an interactive electronic toy system enabling a user to complete a crafting challenge, where the user may be a child or an adult.

BACKGROUND OF THE INVENTION

Toys and kits for creating crafts have existed for many years, and include various types of crafts such as needlepoint kits, kits for creating mosaics, beads that can be attached to one another, and the like. Such existing crafting kits are static kits—they enable the creation of a fixed and small number of patterns (typically no more than five patterns) and supplies for creating those patterns. The user has no ability to create additional or other patterns, and needs to purchase a new kit for creating additional patterns or more complicated patterns.

Additionally, the kits on the market are limited to a specific type of crafting—in order to practice different types of crafts, one must buy numerous kits, one for each craft type.

Furthermore, in the existing crafting kits, the pattern and/or instructions are typically printed on a piece of paper or cardboard, and as such are prone to being lost or ruined. Moreover, the printed instructions typically do not include step-by-step instructions, but rather just show the completed pattern, and leave it up to the user to figure out how to reach that completed pattern.

There is therefore a need in the art for a crafting system that enables the user to select from a large variety of patterns in a variety of levels, and for creating a variety of crafts. There is also a need in the art for a system providing to the user step-by-step instructions for creating a complex craft, and for providing to the user feedback regarding the craft he or she is creating during creation of the craft or correcting errors once the craft is complete.

SUMMARY OF THE INVENTION

The invention, in some embodiments, relates to the field of electronic toys, and more specifically to an interactive electronic toy system enabling a user to complete a crafting challenge, where the user may be a child or an adult.

In accordance with some embodiments of the invention, there is provided a crafting system for guiding a user in creating a craft, the system including:

at least one crafting challenge repository storing a plurality of crafting challenges, each including instructions for creating a specific craft;

a display surface adapted to have one or more the crafting challenges displayed thereon;

a controller including:

a processor functionally associated with the crafting challenge repository and with the display surface; and a non-transitory computer readable storage medium storing software modules including instructions to be executed by the processor, the non-transitory computer readable storage medium having stored:

instructions to receive a selection of a selected crafting challenge to be displayed on the display surface; and a challenge preparation module including instructions to prepare a selected challenge for display on the display surface and to provide the prepared challenge to the display surface for display thereon;

a housing accommodating at least the controller; and at least one at least partially transparent crafting surface, adapted to be removably mounted above the display surface such that when instructions of the prepared challenge are displayed on the display surface, the instructions are visible to the user.

In accordance with another embodiment of the invention, there is provided a method for guiding a user in creating a craft using a crafting system including a controller, a display surface, and at least one crafting surface, the method including:

at the controller, receiving a selection of a crafting challenge to be provided to the user;

receiving a specific crafting surface, suitable for completion of the selected crafting challenge, above the display surface, such that at least part of the display surface is visible through the specific crafting surface;

preparing at least a portion of the selected crafting challenge for provision to the user; and providing the at least a portion of the selected crafting challenge to the user by displaying instructions for completion of the at least a portion of the selected crafting challenge on the display surface.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures:

FIGS. 1A and 1B are simplified block diagram representations of embodiments of an interactive electronic toy system according to two embodiments of the teachings herein;

FIGS. 2A and 2B are flowcharts of embodiments of exemplary methods of using the systems of FIGS. 1A and 1B, respectively;

DESCRIPTION OF SOME EMBODIMENTS OF THE INVENTION

Figure 1A:
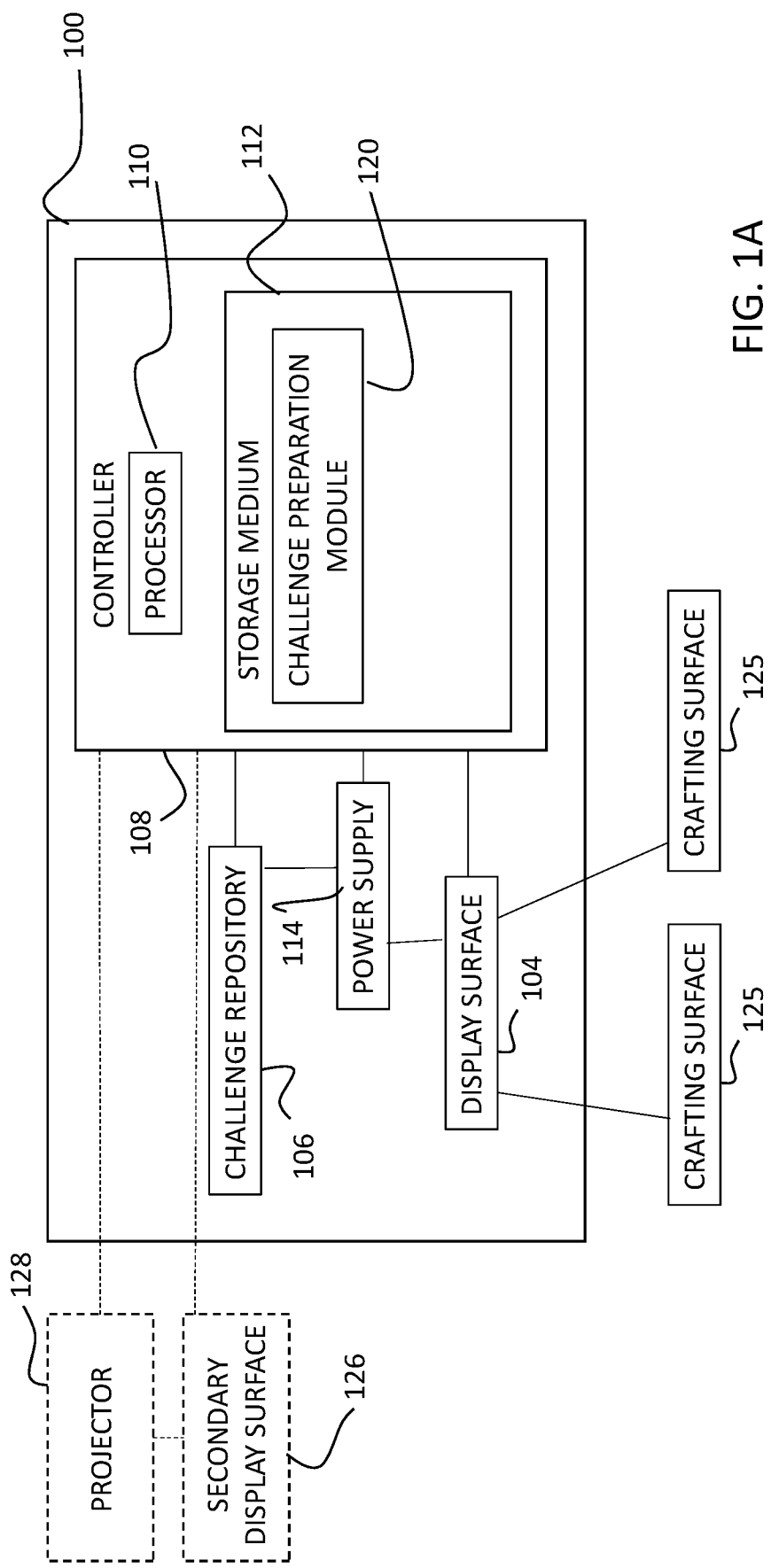

The invention, in some embodiments, relates to the field of electronic toys, and more specifically to an interactive electronic toy system enabling a user to complete a crafting challenge, where the user may be a child or an adult.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the Examples. The invention can be implemented with other embodiments and can be practiced or carried out in various ways. It is also understood that the phraseology and terminology employed herein is for descriptive purpose and should not be regarded as limiting.

The system and method described herein are intended to provide an interactive environment in which a user, typically a child, using an electronic device having a suitable surface or plate attached thereto, is shown one or more crafting challenges, and creates a craft on the plate so as to complete the challenge(s). In some embodiments, the user may receive feedback as to the accuracy of the response or of the created craft, or as to a method in which the response was provided. The feedback provided to the user may relate to the actual response, e.g. whether or not the user used the correct colors in the correct places, or may relate to the method by which the craft was created, e.g. whether upper stitch of all the cross stitches is in the same direction.

The challenges may be provided in a step-by-step manner, so as to teach the user to create a more complex craft. For example, a series of challenges may teach the user to create a specific type of bracelet, or a bead pattern depicting a specific image, where each challenge within the series teaches the user the next step in creation of the craft. In response, the user is expected to mimic the presented image(s) maintaining the correct order in which the image(s) were presented.

As another example, a series of challenges may teach the user to build a three dimensional structure, where each challenge within the series teaches the user to build one layer (or part of a layer) of the three dimensional structure. The challenges are provided sequentially, so as to enable the user to build the entire three dimensional structure without having to figure out exactly what should be included in each layer of the structure, for example as described hereinbelow with respect to FIGS. 6A to 7B.

The system is designed to guide the user in creating a complete craft defined by the challenge or series of challenges, and to allow the user to gradually progress to more complex challenges and crafts.

In the context of the present application and claims, the phrase "at least one of A and B" is equivalent to an inclusive "or", and any one of "only A", "only B", or "A and B".

Reference is now made to FIGS. 1A and 1B, which are simplified block diagram representations of embodiments of an interactive electronic toy system 100 according to two embodiments of the teachings herein.

As seen in FIGS. 1A and 1B, system 100 includes at least one display surface 104, adapted to have one or more challenges, or videos/images associated with challenges displayed thereon to a user. The display surface 104 may be a backlit display surface, such as the display surface of a tablet computer, or a non-backlit display surface, such as the display surface of an electronic reader. The system 100 further includes, or is functionally associated with, at least one crafting challenge repository 106 storing crafting challenges to be presented to the user.

A controller 108 is adapted to control operation of the system, and is functionally associated with challenge repository 106 and with display surface 104. The controller typically includes, but may alternately remotely communicates with, a processor 110, which may be functionally associated with a non-transitory computer readable storage medium 112 storing software modules including instructions to be executed by the processor 110.

One or more power supplies 114 are adapted to provide power to display surface 104, controller 108, and/or challenge repository 106.

In some embodiments, the controller 108 is embodied by a computing device, and may have display surface 104 integrally formed therewith. For example, controller 108 and display surface 104 may together form a tablet computer, a smartphone, a laptop computer, a desktop computer, or any other suitable computing device that has electrical image/video inputs and can provide the image/video as output to a display surface.

The display surface 104 be a "built in" display surface, which together with controller 108 forms part of the computing device, such as the screen of a tablet computer, or may be external to controller 108, such as a separate display screen in operative communication with the controller 108. For example, controller 108 may be a computing device such as a tablet computer, and display surface 104 may be a separate screen, which is in communication with controller 108.

The challenge repository 106 may be any suitable storage element for storing digital data, such as a database, a computer memory, or a buffering memory. The challenge repository 106 may be local to the system 100. For example, the challenge repository 106 may be in the form of a data storage element, such as a removable memory card inserted into a dedicated slot in controller 108 or a database or memory component built into system 100. In some embodiments, the challenge repository may be remote from system 100. For example, challenge repository 106 may be a database located remotely from system 100 and communicating therewith, for example with controller 108, via a network, as explained in further detail hereinbelow.

In some embodiments, the challenge repository 106 is adapted to store, at least temporarily, large amounts of data, in the range of 5 MB to 500 MB. In embodiments in which the challenge repository 106 is local to system 100, it may enable the system 100 to operate even when not in communication with a network or with another remote device. The challenge repository 106 may be volatile or non-volatile memory, such as a flash memory device, retaining the stored data, even when the power is switched off and on, thus accelerating the device start up time.

Power supply 114 may be any suitable power supply, such as a battery, a rechargeable battery, or a port for connection to a wall mounted socket or other power source. In some embodiments, system 100 is portable, and is designed to be operable without connection to an external power source, or at a distance greater than 1 meter from an external power source, for extended durations of time, in the range of 2-4 hours of non-stop operation.

In some embodiments, a housing houses the display surface 104, and the controller 108. In some embodiments, the housing may also house the power supply 114 and/or the challenge repository 106.

A mentioned hereinabove, controller 108 includes, or remotely communicates with, processor 110 which is operative to execute instructions included in software modules stored in storage medium 112. Storage medium 112 includes a challenge preparation module 120, which is a software module adapted to prepare a challenge for display on display surface 104. The challenge typically includes an image and/or a video, and such preparation may include:
- changing a format of the image and/or video so as to use a format suitable for display surface 104;
- scaling the image and/or video to a size suitable for use by and/or adapted to the dimensions of display surface 104;
- applying at least one filter to the image and/or video; and/or
- dividing a video into individual sequential frames or images.

Challenge preparation module 120 may also employ image processing algorithms, so as to compensate for optical, geometric, and/or chromatic distortions arising from the physical limitations of the display surface 104. The prepared challenge image/video may then be transmitted, by the controller 108 for display on display surface 104.

It is appreciated that in embodiments in which the challenge is audible, or also audible, the challenge preparation module 120 may also be adapted to prepare audio associated with the challenge for being played on an audio speaker element associated with controller 108, for example by adjusting the volume, pitch, or voice of the speaker providing the challenge. In some embodiments, the audio speaker element may form part of system 100, for example as part of a computing device including display surface 104 and controller 108. In other embodiments, the audio speaker element may be separate from system 100, as described in further detail herein below.

System 100 further includes at least one crafting surface 125, removably attachable over display surface 104 such that display surface 104, or portions thereof, is/are visible beneath the crafting surface. As explained in further detail hereinbelow, in use, the user creates a craft on crafting surface 125, following the guidance of the challenge(s) displayed on display surface 104. Crafting surface 125 may be any suitable type of crafting surface for creating any suitable type of craft, including:
- a peg board suitable for creating a craft from beads which adhere to one another by heat (ironing) or by an applied fluid (water or glue);
- a surface including areas, slots, or compartments for receiving mosaic pieces, which mosaic pieces may be sticker mosaic pieces, stone mosaic pieces connected by glue, foam mosaic pieces held in place by a frame, and the like;
- a surface including slots for receiving miniature balls which adhere to one another by an applied fluid;
- a surface including hooks for creating a craft from rubber bands;
- a surface including a loom for creating a beaded craft of a yarn craft;
- a surface for holding at least one edge of a friendship bracelet while the bracelet is being created;
- a surface defining bores for receiving pins suitable for forming a string art craft;
- a surface suitable for holding an embroidery or needlepoint fabric for pre-coloring of the fabric in preparation for embroidering thereon;
- a base surface for building blocks which can be connected to one another, or interlinked; and
- a surface suitable for glass painting or for creation of a stained glass project.

In addition to display surface 104 on which the crafting surface 125 is placed and on which the crafting action takes place, as explained hereinbelow, in some embodiments system 100 may also include a secondary display surface 126, on which instructions to the user may be provided when display surface 104 is not visible. For example, in some embodiments in which the craft includes building a three dimensional model, instructions may be provided on display surface 104 for building the first layer of the three dimensional model. However, in some embodiments, the first layer of the model obstructs the visibility of the display surface 104 through the crafting surface 125. In such embodiments, instructions for building the second layer of the three dimensional model may be provided on the secondary display surface 126. In some embodiments, the secondary display surface 126 may be a display surface of a second electronic device, or a non-electronic display surface onto which information is projected by a suitable projector 128, functionally associated with the controller 108. In some embodiments, the secondary display surface 126 may include a layer of the craft being created, onto which information is projected by the projector 128, as explained in further detail hereinbelow.

Turning now to FIG. 1B, the Figure shows a system 100 including all the components of the system of FIG. 1A, as well as additional components which may, in some embodiments, form part of a system according to the present invention.

In some embodiments, the system may include a user interface 130, which may for example be disposed on an exterior surface of the housing or may be displayed on display surface 104, if the display surface is responsive to user input, such as a touchscreen.

The user interface may include any suitable buttons and/or other input or output elements. For example, the user interface may include buttons adapted for navigating between challenges in the challenge repository (moving to the previous and next challenge, respectively), buttons for navigating between steps of a multi-step challenge, as described in further detail hereinbelow, a "home" button for returning to the first step of the first challenge in the challenge repository, and a "repeat" button for repeating the last step of the challenge currently being completed.

In some embodiments, the user interface may additionally include visual indicators, such as LED lights, for indicating to the user when the processor is communicating with another device or for providing any other indication to the user. In some embodiments, different colors of illumination or different flashing patterns of light emitted by the visual indicators may indicate different types of communication or actions being carried out by the system.

In some embodiments, some of the buttons of the user interface may have more than one function. For example, the "home" button may function as described above when pressed briefly, and, upon a longer press by the user, may control the speed at which an animation or video is displayed. As another example, the "repeat" button may repeat the most recent challenge step when pressed briefly, and if pressed for a longer time may turn on or off an "auto-play" mode of the steps of the challenge, where the display moves to the next challenge step automatically after a predetermined duration of displaying the current challenge step.

In some embodiments, for example in embodiments in which voice commands may be provided to controller 108, the user interface may further include a microphone (not shown) or other element adapted to capture a voice command from the user. In some embodiments, in which the challenge is audible or has audio associated therewith, the user interface may further include a speaker or other audio providing element (not shown) for providing the audible output to the user.

In embodiments in which the system 100 includes a user interface as described, storage medium 112 of controller 108 further includes a UI (user interface) input analysis module 140, which is a software module adapted to identify input received by the user via the user interface (for example to identify what button was pressed or what voice command was provided via a microphone), and enables controller 108 to change the image displayed on display surface 104 in response to the input received from the user.

In some embodiments, system 100 may further include a transceiver 142, enabling two way communication with a networked environment, for example via a Local Area Network (LAN), a Wide Area Network (WAN), or via the Internet. The two-way communication may be wired communication or wireless communication, and may use any suitable protocol known in the art. In such embodiments, power supply 114 provides power also to transceiver 142.

Transceiver 142 is particularly useful when the challenge repository 106 is remote from system 100, such that a challenge may be selected from the challenge repository 106 and provided to the controller 108 via the transceiver 142. In some embodiments, the transceiver 142 may be used to provide to controller 108 input to be presented to the user, the input received from a remote location via the transceiver. For example, the challenge provided to the user may be electronically defined by a remote guide, such as a teacher or professional crafter, therapist such as an occupational therapist, and the like, and transmitted to the controller 108 of the system 100 operated by the user via transceiver 142.

In some embodiments, the system 100 may further include at least one response capturing device 144, which may be functionally associated with controller 108 and which may be adapted to capture one or more images of the display surface 104, of the crafting surface 125, of the vicinity of the display surface 104 and/or the crafting surface 125, and/or of the user interacting with the crafting surface 125, so as to capture the user's response to a challenge displayed on display surface 104. The response capturing device 144 provides the captured image(s) to controller 108. For clarity, the following description relates to a single response capturing device 144, though it is appreciated that any suitable number of image capturing devices may be used.

Response capturing device 144 may be any suitable image capturing devices, including an image sensor, an image signal processor, a two-dimensional stills camera, a two-dimensional video camera, a three-dimensional stills camera, or a three-dimensional video camera. Response capturing device 144 is arranged so as to capture one or more images of the display surface 104 and/or crafting surface 125 into an encoded digital format, so as to capture the multi-dimensional spatial and/or temporal image of the display surface 104 and/or crafting surface 125. When multiple response capturing devices 144 are used, they may be arranged so as to capture images of display surface 104 and/or crafting surface 125 from different angles and/or vantage points.

In some embodiments, the response capturing device 144 is movable relative to display surface 104 and crafting surface 125, for example by being mounted onto a movable arm. In such embodiments, response capturing device 144 may also capture one or more images of locations in or surrounding system 100, other than display surface 104 and crafting surface 125.

In some embodiments, a response captured by response capturing device 144 may be transmitted, for example via transceiver 142, to a remote location, for example to a location preset by the user when determining the settings of controller 108. For example, in an embodiment in which the challenge is designed to teach a child how to create a craft, an image of the child's craft may be transmitted to the parent.

In embodiments in which the system 100 includes a response capturing device 144 as described hereinabove, storage medium 112 of controller 108 may further include a response analysis module 146, which is a software module adapted to receive data, such as one or more images, captured by response capturing device 144, and to analyze the captured response so as to determine whether or not the user has correctly responded to the challenge.

In some embodiments, in which the response capturing device 144 captures one or more images of the response provided by the user, the response analysis module 146 may implement computer vision and/or machine learning algorithms to compute an error function and to determine whether the response provided by the user, as captured as an image by response capturing device 144, matches an expected input, or is correct. The algorithms used by response analysis module 146 may include algorithms for two-dimensional pattern matching and/or algorithms for three dimensional depth analysis of the captured image or images.

Response analysis module 146 may also employ image processing algorithms, so as to compensate for optical, geometric, and/or chromatic distortions arising from the physical limitations of response capturing device 144. In some embodiments, the response analysis module 146 may further analyze the methodology by which the user provides the response to the challenge.

In some embodiments, storage medium 112 of controller 108 may further include a feedback module 148, adapted to use results of the analysis conducted by response analysis module 146, and to generate feedback for transmission to the user. The feedback may be visual feedback, provided for example on the display surface 104, or audio feedback, provided via an audio output system (e.g. speakers, not shown) functionally associated with controller 108, tactile feedback provided via a vibration engine (not shown) or associated with controller 108, or any other suitable type of feedback.

In some embodiments, feedback module 148 may provide feedback relating directly to the user's response to the challenge, such as an indication that the user used an incorrect color in a specific region of their craft. Feedback module 148 may additionally provide feedback relating to the methodology by which the user completed the challenge, for example relating to steps taken to solve the challenge, or to physical characteristics applied while solving the challenge such as the grip of a crafting utensil. In the context of the present application, the term "crafting utensil" relates to any type of device or component used for creating a craft, including pieces of the craft, such as mosaic pieces, beads, etc., as well as implements helping in the creation of the craft, such as suitable dedicated, needles, pencils, and the like.

In some embodiments, controller 108 or a portion thereof may be part of, or may be in communication with, an additional computing device 150 (FIG. 2), for example via transceiver 142. In some embodiments, the additional computing device 150 may be a handheld or mobile computing device, such as a suitably equipped mobile telephone or tablet computing device, while in other embodiments the additional computing device may be a computing device in a fixed location, such as a desktop computer. In some such embodiments, an application may be operated on the additional computing device 150 so as to enhance the user's experienced interfacing with the system 100, as well as to reduce load on controller 108 or processor 110 by serving as a low-level tool for off-loading tasks from controller 108. Such tasks may include data transportation, temporary or permanent data storage and manipulation, algorithmic calculations, networked tasks, and the like. The additional computing device 150 may function in a slave capacity or in a master capacity. In some embodiments, the additional computing device 150 may be placed in close proximity to system 100 so as to form a virtual extension of the system 100.

In some embodiments, the application running on the additional computing device 150 provides a second user interface, allowing the user to select challenges from challenge repository 106 and to move between steps of a challenge. In some such embodiments, the application is synchronized with controller 108, such that any action taken on user interface 130 is reflected in the application, and vice versa.

In some embodiments, built-in components of the additional computing device 150 may be used for providing the challenge to the user or for receiving the user's response to the challenge. For example, in embodiments in which the challenge is (also) audible, the audio of the challenge may be provided to the user via a speaker system built into the additional computing device 150.

In some embodiments, the challenge response captured by response capturing device 144 and/or the feedback generated by feedback module 148, may be provided to the user via additional computing device 150, for example as visual feedback provided on a display of the additional computing device or as audio feedback provided via the speaker of the additional computing device.

In some embodiments, system 100 may further include an inactivity sensing functionality adapted to identify when the system 100 has been inactive for a predetermined duration, and to provide such information to controller 108 for adapting operation thereof so as to preserve power consumption by the system 100 when it is inactive. In some such embodiments, the inactivity sensing functionality may form part of response capturing device 144 or may be a software module adapted to analyze images captured by the response capturing device to identify inactivity. In some embodiments, the inactivity sensing functionality may be a software module running on controller 108 and identifying when no change has been made to the displayed image for a predetermined duration. In other embodiments, the inactivity sensing functionality may operate based on input received from a proximity sensor, a motion sensor, or an audio sensor forming part of system 100.

In some embodiments, in response to detection of inactivity by the inactivity sensing functionality, processor 110 of controller 108 and/or other processors included in system 100 may run a low power efficiency power scheme adapted to conserve power in system 100, which scheme may trigger actions such as dimming of one or more light sources associated with display surface 104, reducing a frequency of image or audio capturing by response capturing device 144, shutting down non-critical modules, and the like.

In some embodiments, the system 100 further includes a thermal sensor 160, adapted to provide input to controller 108 react when a temperature level in system 100 exceeds a predetermined threshold. The processor 110 of controller 108 may then operate a temperature control module 162 to adjust the operation of system 100 to the elevated temperature level, for example by shutting down system 100, or by notifying the user of the elevated temperature, thereby to provide for safe and robust device operation. The user notification may be provided, for example, by displaying a warning message onto display surface 104 by providing a visual warning message on a display of additional computing device 150, or by providing an audible warning signal via a speaker, such as a speaker of additional computing device 150 or a speaker forming part of user interface 130.

It is appreciated that for ease of understanding, all the software modules disclosed herein, including challenge preparation module 120, UI input analysis module 140, response analysis module 146, feedback module 148, temperature control module 162, and the inactivity sensing module are illustrated being stored in storage medium 112 of controller 108 for operation by processor 110. However, it is appreciated that any one or more of these modules may also run on a processor remote to controller 108 and in communication therewith via transceiver 142, such as for example a processor of additional computing device 150.

In the embodiment of FIG. 1B, the power supply 114 is adapted to power, in addition to controller 108 and display surface 104, any other components of the system requiring power, except for the additional computing device 150. As such, power supply 114 may provide power to the user interface 130, to the transceiver 142, to response capturing device 144, and/or to thermal sensor 160.

Figure 2B:
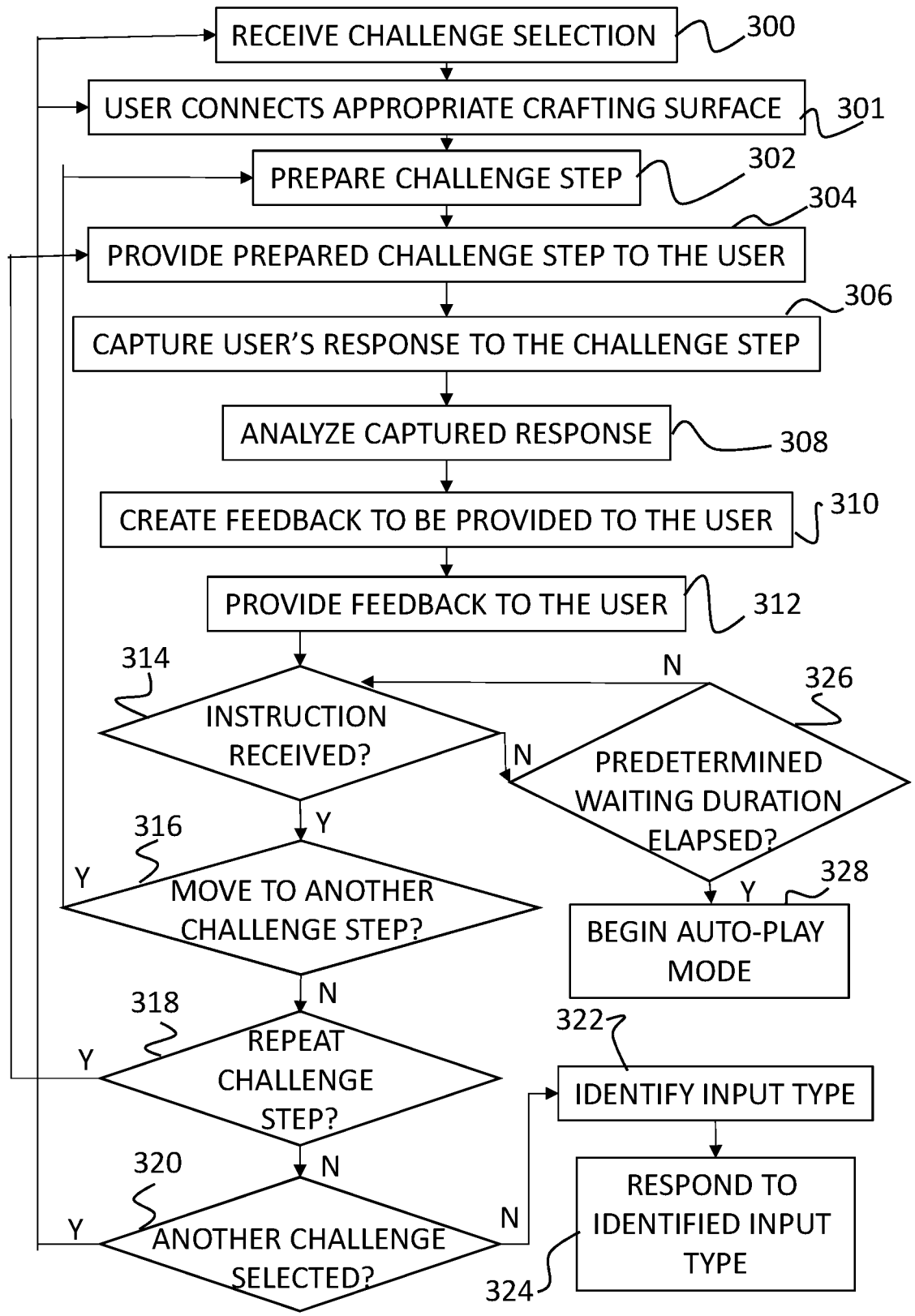

Reference is now additionally made to FIGS. 2A and 2B, which are flowcharts of embodiments of exemplary methods of using the systems of FIGS. 1A and 1B, respectively. It is appreciated that though the description hereinbelow relates to specific elements of systems 100 shown in FIGS. 1A and 1B, this is merely an example used to enhance clarity, and any suitable device may be used in implementation of the methods of FIGS. 2A and 2B.

As seen in FIG. 2A, at step 200 a selection of a challenge to be provided to the user is received by controller 108. The challenge is typically selected from challenge repository 106.

In the embodiment of FIGS. 1A and 2A, the challenge repository may include a single challenge, and selection of the challenge is carried out by associating the challenge repository with controller 108. For example, the challenge repository may be a computer storage drive, such as an SD card, USB drive, or the like, including a single challenge. As such, the challenge is selected by selecting a suitable challenge repository and inserting it into a suitable slot or port in system 100, so as to associate the computer storage drive with the controller 108.

In some embodiments, the challenge is automatically selected by the controller 108, for example based on a user profile including information about the user, such as the user's age, challenge completion level, educational/therapeutic needs, and user preferences.

The challenge may be in the form of an image, a video clip, or audio instructions, and is typically a challenge to be mimicked by the user (e.g. create a mosaic according to a displayed pattern).

In some embodiments, the challenge may be a multi-step challenge including a plurality of challenge steps, so as to allow the user to complete the challenge in a step-by-step manner. For example, the challenge may teach the user to create a friendship bracelet by breaking the process into individual steps each teaching the user to create a specific knot or group of knots to form the bracelet. As another example, the challenge may teach the user to build a three dimensional car from three dimensional building blocks, by breaking the three dimensional car into individual steps, each teaching the user to create a specific layer of the three dimensional car, so as to form the car, as described hereinbelow with respect to FIGS. 4A and 4B. In some embodiments, the step for each layer of the car may in turn be broken into individual sub-steps, which would be easier for the user to follow.

The challenge may be any suitable challenge which may be provided to the user by system 100, as described herein. In some embodiments, the challenge may include any one or more of the following types of challenges:
- creating a craft based on a pattern displayed on the display surface, the craft being formed of beads, spheres, adhesive mosaic tiles, foam mosaic tiles, or stone mosaic tiles, the craft being two dimensional or three dimensional;
- creating a bracelet or other object from beads (e.g. using a bead loom), rubber bands, strings (e.g. a friendship bracelet);
- creating a pre-colored embroidery or needlepoint fabric;
- creating a string art project where string is wound around needles;
- creating a stained glass (or similar) craft; and
- building a three dimensional model from interlinking building blocks.

The user then connects a crafting surface 125 suitable for the selected challenge onto the display surface 104, at step 201. In some embodiments, the user may be prompted to connect a specific crafting surface 125 to the display surface.

The selected challenge is then prepared for being provided to the user, for example by challenge preparation module 120. In some embodiments, in which the challenge is, or includes, an image, the preparation includes processing of the image to accommodate the conditions in which the challenge is to be provided, such as the specific display surface 104 and/or secondary display surface 128 and illumination conditions in the vicinity of system 100.

When using the device of FIG. 1A, which does not include a user interface, and when the challenge includes more than one challenge step, preparation of the challenge includes preparing the challenge steps to be provided to the user in sequence. In some such embodiments, each of the challenge steps is prepared by the challenge preparation module 120 in advance of display of any challenge steps, as illustrated at step 202*a*. In other embodiments, the preparation of the challenge includes preparation of the first challenge step, as illustrated at step 202*b*, and subsequent challenge steps are prepared during display of the previous challenge steps, as described herein.

If the challenge has been fully prepared, for example the challenge includes a single step or all the challenge steps have been prepared at step 202*a*, the prepared challenge is then provided to the user at step 204*a*. This may be carried out by displaying the challenge on display surface 104 by controller 108, and/or by providing audio associated with the challenge to the user via a speaker. In some embodiments, in which the challenge includes multiple challenge steps, the steps are provided to the user in sequence, each step being provided for a predetermined duration before providing the next step.

For example, the challenge may relate to building a three dimensional structure from suitable building blocks, each being transparent and/or having a light guide disposed therethrough, and each challenge step includes visual instructions for building a layer of the three dimensional structure. In such embodiment, a crafting surface 125 which is at least partially transparent or translucent and which comprises a base for the building blocks, is disposed on display surface 104. The instructions for the first layer may be provided by the display surface 104, and may be visible through the crafting surface 125. The instructions for any subsequent layers may be provided on display surface 104, and may be visible via the light guides in the building blocks of the lower layers, so that the information for building the next layer is conveyed to the user, from display surface 104, via the light guides, to the upper portion of the three dimensional structure, for example as shown in FIGS. 3A to 4B.

In some embodiments, some of the challenge steps may be provided by displaying the step on secondary display surface 126, by controller 108 and/or by projector 128.

For example, the challenge may relate to building a three dimensional structure from suitable building blocks, and each challenge step includes visual instructions for building a layer of the three dimensional structure. In such embodiment, a transparent or translucent crafting surface 125, comprising a base for the building blocks, is disposed on display surface 104. The instructions for the first layer may be provided by the display surface 104, and may be visible through the crafting surface 125. However, if the building blocks are opaque, instructions for the second layer, or the second step of the challenge, provided on display surface 104 would no longer be visible through the already built first layer. As such, subsequent steps of the challenge, or instructions for building the layers above the first layer, may be provided on the secondary display surface 126. the secondary display surface 126 may be the screen of a secondary device, such as additional device 150, and the step may be provided to the user as an image or as textual instructions on the secondary display surface 126. As another example, the secondary display surface 126 may include a layer of the craft already created on the crafting surface 125, and the next step may be projected onto the layer of the craft by projector 128.

However, if the preparation of the challenge included only preparation of the first challenge step, that challenge step is provided to the user in step 204*b*, and concurrently with providing the challenge step to the user, the controller 108 evaluates whether there is another challenge step to be provided to the user at step 206, and if there is another step to be provided to the user, at step 208 the controller prepares the next challenge step for provision to the user, as described hereinabove. When the predetermined duration for providing the previous step to the user has passed, the next step is now prepared for providing to the user, and is provided to the user at step 204*b* as described herein. In some embodiments, in which completion of the first challenge step provided to the user obstructs the visibility of the display surface 104 via the crafting surface 125, subsequent steps may be provided to the user on the secondary display surface 126, for example by controller 108 and/or by projector 128, as described hereinabove.

Turning now to FIG. 2B, at step 300 a selection of a challenge to be provided to the user is received by controller 108. The challenge is typically selected from challenge repository 106.

The challenges may be substantially as described above with respect to FIG. 2A. In some embodiments, selection of the challenge may be as described above with respect to FIG. 2A.

In some embodiments, in which the challenge repository 106 is local to system 100 and includes more than one challenge, the selection of a desired challenge is provided to controller 108 from the user interface via UI input analysis module 140. For example, the user may insert a computer storage drive, such as an SD card or a USB drive, into a suitable slot in system 100, so as to connect a specific challenge repository, and then select a specific challenge from the challenge repository or computer storage drive by operating the buttons of user interface 130, as described hereinabove.

In some embodiments, the challenge repository 106 is remote from system 100, such as a database provided on a network in communication with system 100 via transceiver 142. In such embodiments, the user or a guide thereof, such as a teacher, professional crafter, therapist, or the like, may select a challenge from the challenge repository operating a user interface associated with the network or the database, and the challenge may be provided to controller 108 via transceiver 142. For example, the user may access a networked database of challenges, located on the Internet, via a browser of additional computing device 150, and may select a desired challenge which will be transmitted from the additional computing device 150 to controller 108 via transceiver 142.

In some embodiments, the challenge may be generated by the user using an image capturing device, such as a camera. For example, the user may capture an image of his or her surroundings using a camera of additional computing device 150. The captured image may be processed to form an outline image or a coloring page image, for example as disclosed in U.S. Pat. No. 6,740,379 filed Mar. 3, 2016 and issued Aug. 22, 2017, which is incorporated by reference as if fully set forth herein. The outline image may then be provided directly to controller 108 as the challenge image to be traced, or may be placed in challenge repository 106 and selected therefrom as described hereinabove.

The user then connects a crafting surface 125 suitable for the selected challenge onto the display surface 104, at step 301. In some embodiments, the user may be prompted to connect a specific crafting surface 125 to the display surface.

At step 302, the selected challenge, if the challenge is a single step challenge, or a first challenge step of a multi-step challenge prepared for being provided to the user, for example by challenge preparation module 120. In some embodiments, in which the challenge is, or includes, an image, the preparation includes processing of the image to accommodate the conditions in which the challenge is to be provided, such as the specific display surface 104 and illumination conditions in the vicinity of system 100. The prepared challenge or challenge step is then provided to the user at step 304. This may be carried out by displaying the challenge on display surface 104 by controller 108, by displaying the challenge on secondary display surface 126 by controller 108 and/or by projector 128, and/or by providing audio associated with the challenge to the user via a speaker.

In some embodiments, in which the challenge includes multiple challenge steps, the steps are provided to the user in sequence, each step being provided for a predetermined duration before providing the next step. In some such embodiments, some of the steps may be provided using the secondary display screen 126, as described hereinabove.

In some embodiments, at step 306, the response capturing device 144 captures the user's response to the challenge, which may be provided, for example, by placing items on crafting surface 125 above display surface 104, or on a previously formed layer of the craft, as defined in the challenge. In some embodiments, the user's response is captured in one or more images captured by the response capturing device.

In some embodiments, at step 308, the captured user response is analyzed by response analysis module 146, so as to determine whether the response provided by the user was correct, and whether it was provided in the correct manner. For example, if the challenge was creating a pattern using adhesive mosaic tiles, the response analysis module 146 may determine from the captured input whether the colors of the tiles used by the user match the colors indicated in the challenge. As another example, if the challenge was creating a rubber-band bracelet using a suitable hook, the response analysis module 146 may determine from the captured input whether the user holds and/or manipulates the hook correctly.

In some embodiments, at step 310, feedback module 148 uses the results of the analysis conducted at step 308 to create feedback for provision to the user. The feedback may be visual feedback, for example showing the user how the hook should be held, or may be audio feedback, for example explaining to the user that the colors in the pattern shown on display surface 104 should be followed in the user's craft, and instructing the user to try again. The feedback is provided to the user at step 312, for example via display surface 104, via secondary display surface 126, and/or via a speaker associated therewith or with controller 108.

In some embodiments, the feedback module may also provide feedback to a remote device or location, such as a device operated by a parent, teacher, therapist, or other guide.

Controller 108 awaits additional user instructions, provided via the user interface or a user interface of the additional computing device 150, at step 314. When new input has been received, the UI input analysis module 140 determines whether the input was an instruction to move to another challenge step at step 316. If the input was an instruction to move to another challenge step, the method returns to step 302, where the another challenge step is prepared for providing to the user.

Otherwise, the UI input analysis module 140 determines whether the input was an instruction to repeat the step at step 318. If the input was an instruction to repeat the step, the method returns to step 304 and again provides the same step to the user.

If at step 318 the instruction was not to repeat the step, the UI input analysis module 140 determines whether the input was a selection of another challenge at step 320. If the input was the selection of another challenge, the method returns to step 301 for the user to connect a crafting surface 125 suitable for the new challenge, or to step 302 for preparation of the new challenge for provision to the user, if the new challenge is of the same type as the previous challenge.

Otherwise, the UI input analysis module 140 identifies the type of input provided from the user interface at step 322, and the controller 108 responds accordingly at step 324, for example by turning on an auto-play mode of the challenge or changing a speed in which the challenge is displayed.

In some embodiments, if no input was received from the user interface, the controller 108 determines whether a predetermined time duration has passed since input has been received at step 326, and if the predetermined duration has passed, the controller 108 may, at step 328, begin processing and displaying the challenge in "auto-play" mode, as described hereinabove with respect to FIG. 2A. Alternately, if the predetermined time duration has passed, the system may begin to operate as required when the inactivity sensing functionality has indicated inactivity of the system.

It is appreciated that though the description herein relates to capturing the user response, analyzing the user response, and providing feedback to the user for each challenge step individually, these actions may be carried out only once after the whole challenge has been completed, only after some of the challenge steps, or need not be carried out at all.

It is further appreciated that in some embodiments, in which the challenge is presented in auto-play mode, the system does not await input from the user interface, and the challenge steps are prepared and presented in sequence, for example as described hereinabove with respect to FIG. 2A, with the possibility of analysis of the user's response and providing feedback to the user within the auto-play provision of the challenge steps.

It is appreciated that in some embodiments, the challenge may include crafting of multiple pieces, and then connecting the pieces together. For example, the challenge may relate to building a three dimensional box. Such a challenge may include challenge steps for building each of the sides of the box separately, and additional challenge steps instructing the user how to connect the sides of the box to one another to form the box. In such embodiments, some challenge steps may instruct the user to remove the built craft piece from the crafting surface 125, or to remove the crafting surface 125 from the display surface 104, and to begin building another piece of the craft. Additionally, some challenge steps may be instruct the user to connect pieces of the craft to one another. Such instructions may be provided visually or audibly, and need not necessarily be carried out of a crafting surface as described hereinabove.

Figure 3A:
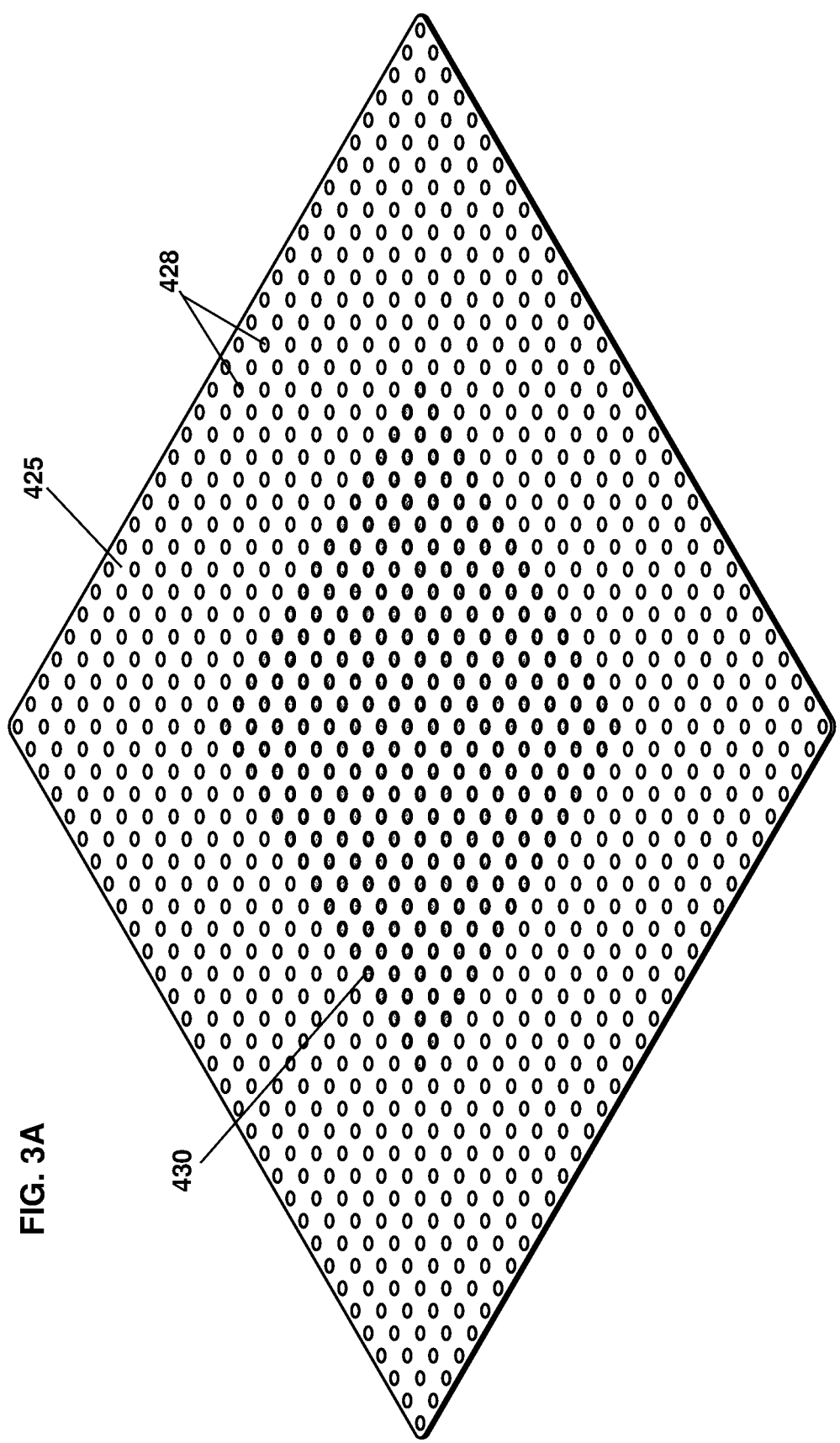
FIGS. 3A, 3B, and 3C are perspective view illustrations of steps of building a three dimensional model using suitable building blocks a system according to the present invention.
Figure 3B:
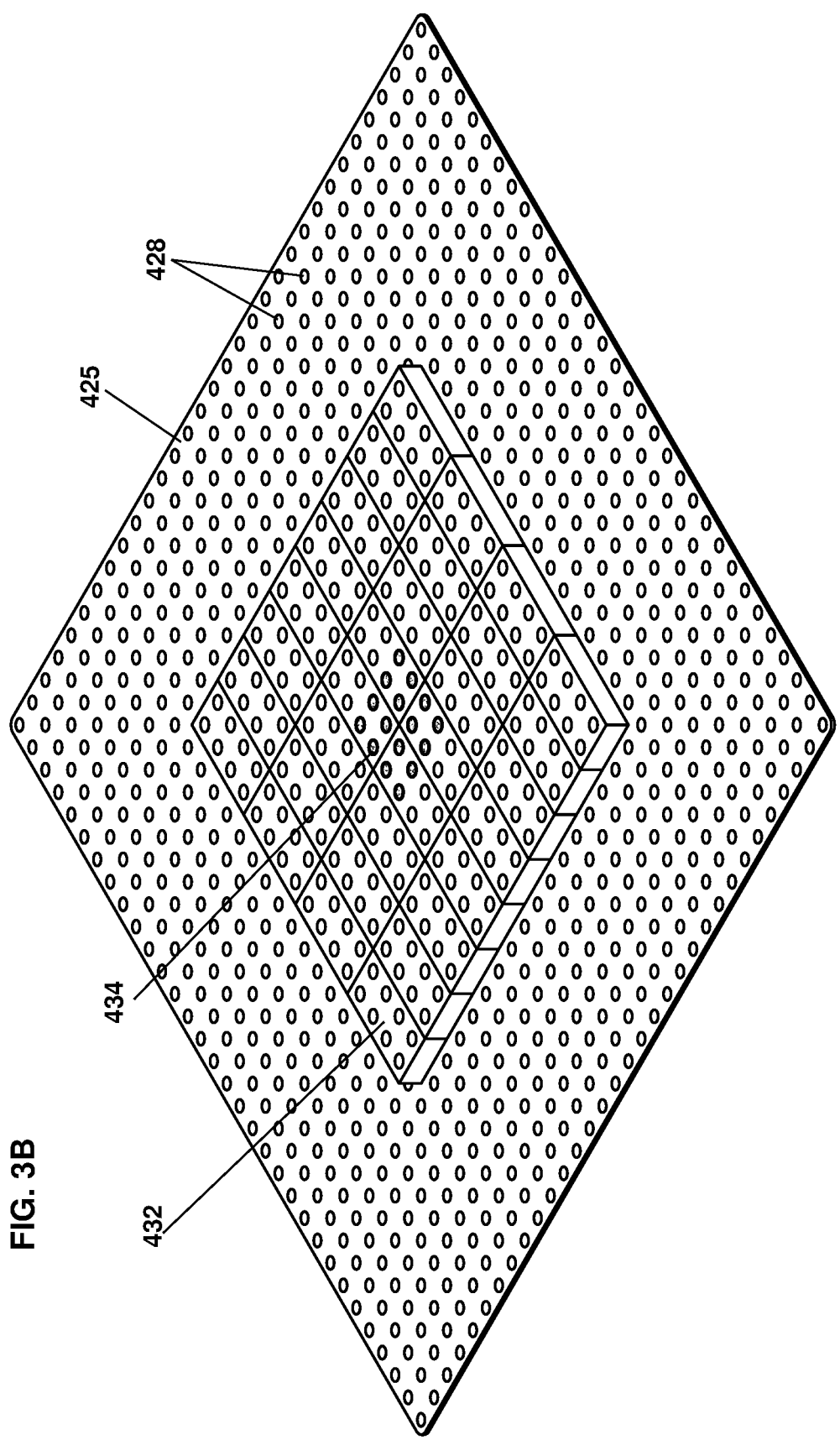
Figure 3C:
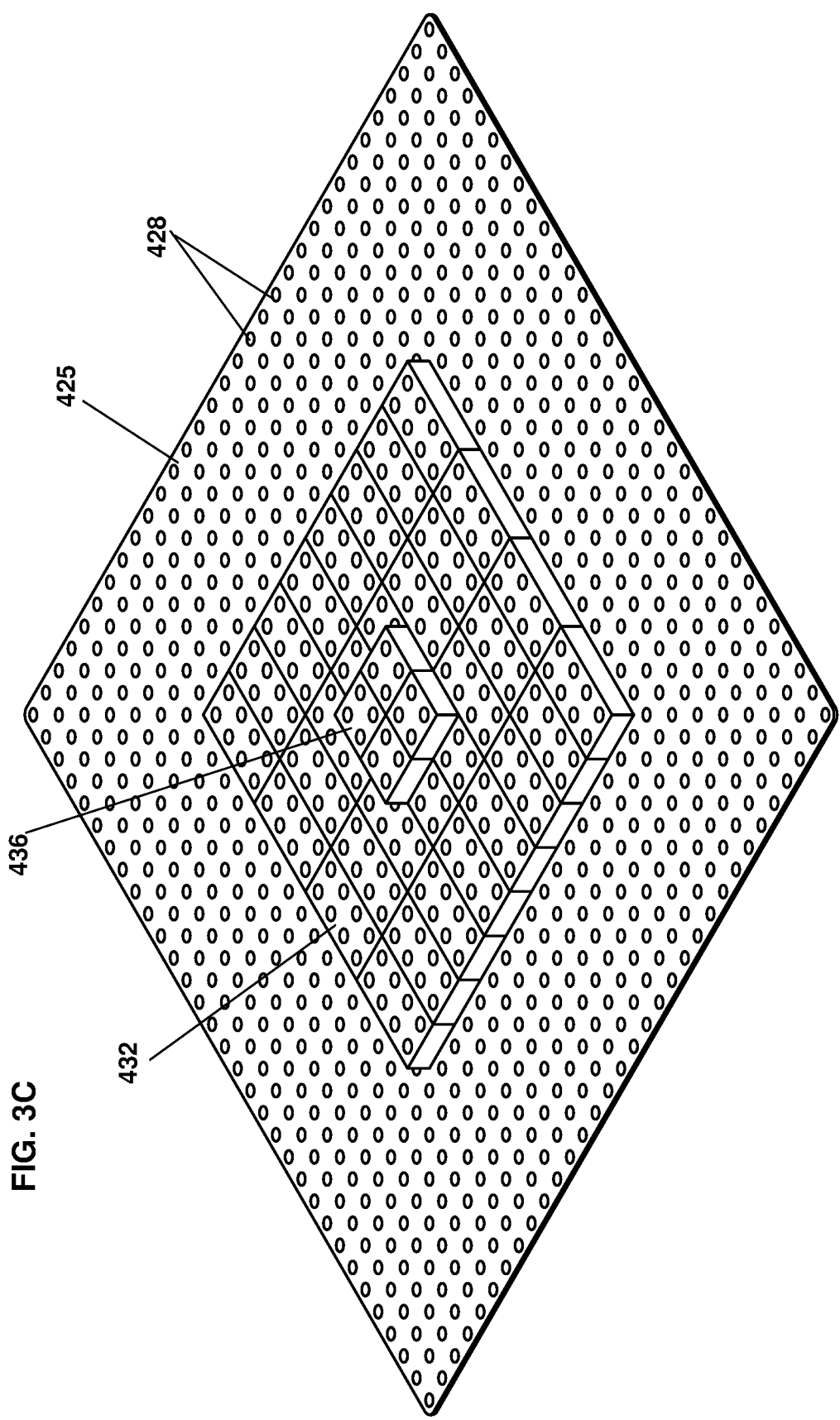

Reference is now made to FIGS. 3A, 3B, and 3C, which are perspective view illustrations of steps of building a three dimensional model using suitable building blocks and a system according to the present invention.

FIGS. 3A, 3B, and 3C show a building block base plate 425, functioning as crafting plate 125 (FIG. 1A), includes anchoring locations 428 for anchoring building blocks thereto, and is disposed above a display screen (not shown), functioning as display screen 104 (FIG. 1A), which display screen forms part of a system as illustrated in FIG. 1A.

As seen in FIG. 3A, in a first construction step, light is illuminated from the display screen through some of the apertures 428, indicating the location and colors of building blocks to be placed on base plate 425. In the illustrated embodiment, the light is purple and forms the shape of a square 430.

In FIG. 3B, the user has placed building blocks as indicated in FIG. 3A over the base plate 425 in the locations indicated by illumination square 430, to form a square of suitable building blocks 432. The instructions for construction of the next layer of the structure are then displayed by the display screen, and are visible via the light guides within the building blocks of square 432. In the illustrated embodiment, the instructions are provided by another color of light emanating from the building blocks of square 432, instructing the user to build a layer of a second color of building block, forming a square 434, that has smaller sides than square 432 and is concentric therewith.

In FIG. 3C, the user has placed building blocks of the second color over building block square 432 in the locations indicated by illumination square 434, to form a square 436 of building blocks of the second color. As such, the user has built a two-layer three-dimensional structure. It will be appreciated that the steps illustrated in FIGS. 3A to 3C may be repeated any number of times, and may be used to build complex structures, for example as illustrated in FIGS. 4A and 4B.

Figure 4B:
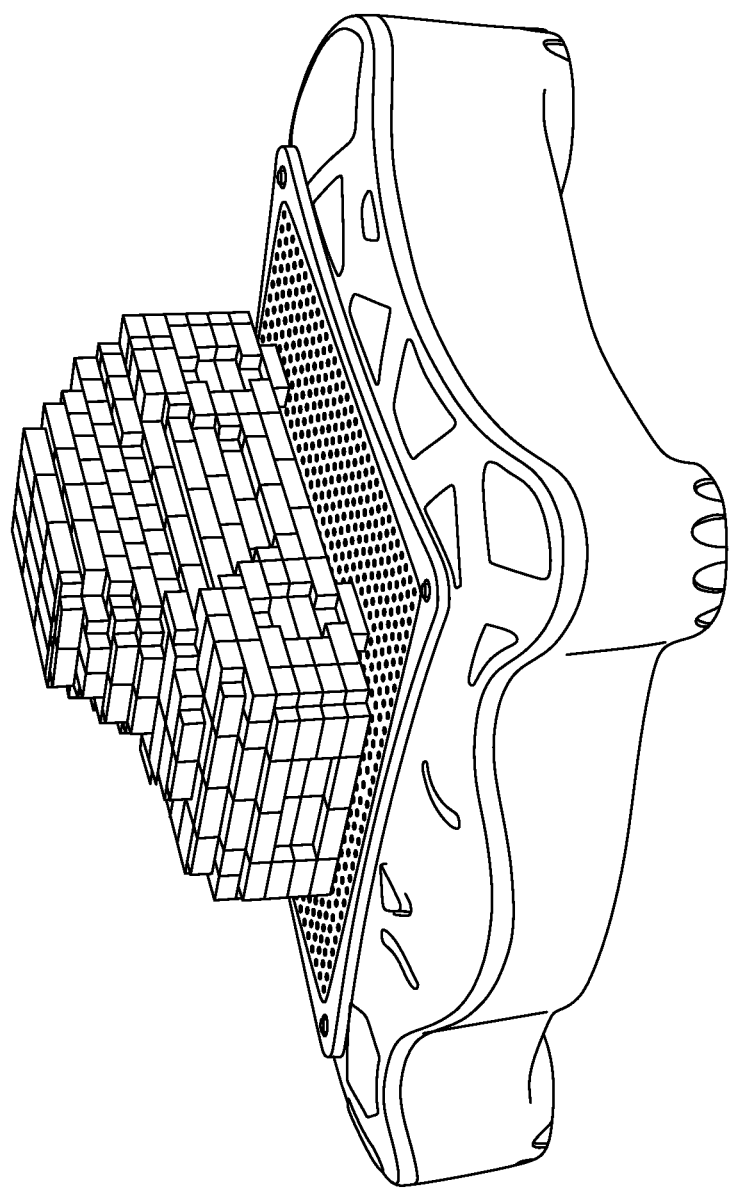
FIGS. 4A and 4B are perspective view illustrations of a three dimensional model of a car, when broken into individual layers and when fully constructed using the suitable building blocks.
Figure 4A:
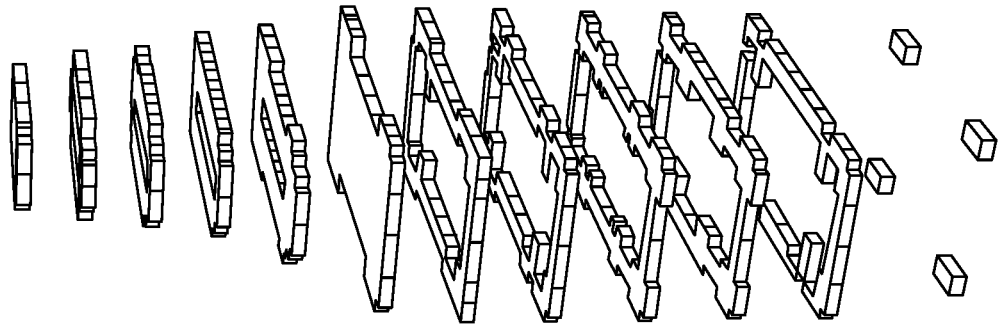

Reference is now made to FIGS. 4A and 4B, which are perspective view illustrations of a three dimensional model of a car, when broken into individual layers and when fully constructed using suitable building blocks.

As seen in FIG. 4A, in order to build a car, the user must build 12 layers of blocks, which indicates the need for a step-by-step and layer-by-layer instruction process as described herein. A car constructed according to such step-by-step and layer-by-layer instructions is illustrated in FIG. 4B, disposed above a crafting system according to FIG. 1A.

Particular and preferred aspects of the subject matter of this Application are set out in the following numbered clauses.

1. A crafting system for guiding a user in creating a craft, the system including:
    at least one crafting challenge repository storing a plurality of crafting challenges, each including instructions for creating a specific craft;
    a display surface adapted to have one or more the crafting challenges displayed thereon;
    a controller including:
        a processor functionally associated with the crafting challenge repository and with the display surface; and
        a non-transitory computer readable storage medium storing software modules including instructions to be executed by the processor, the non-transitory computer readable storage medium having stored:
            instructions to receive a selection of a selected crafting challenge to be displayed on the display surface; and
            a challenge preparation module including instructions to prepare a selected challenge for display on the display surface and to provide the prepared challenge to the display surface for display thereon;
    a housing accommodating at least the controller; and
    at least one at least partially transparent crafting surface, adapted to be removably mounted above the display surface such that when instructions of the prepared challenge are displayed on the display surface, the instructions are visible to the user through the crafting surface.
2. The system of clause 1, wherein the display surface includes a backlit display surface.
3. The system of clause 1, wherein the display surface includes a non-backlit display surface.
4. The system of any one of clauses 1 to 3, wherein the display surface is accommodated on or within the housing.
5. The system of any one of clauses 1 to 4, wherein the display surface, the housing, and the controller form part of a computing device, which computing device includes at least one of a laptop computer, a tablet computer, and a smartphone.
6. The system of any one of clauses 1 to 3, wherein the display surface is external to the housing and is in operative communication with the controller.
7. The system of any one of clauses 1 to 6, further including at least one transceiver for enabling communication between the controller and a network.
8. The system of clause 7, wherein the at least one crafting challenge repository includes a remote crafting challenge repository located remotely from the housing, and in communication with the controller via the transceiver.
9. The system of any one of clauses 1 to 8, wherein the at least one crafting challenge repository includes an integral challenge repository accommodated within the housing.
10. The system of any one of clauses 1 to 9, wherein the housing includes a port adapted for receipt of a data storage element, and the at least one crafting challenge repository includes a removable crafting challenge repository stored on the data storage element, the removable crafting challenge repository adapted to be functionally associated with the controller by insertion of the data storage element into the port.

11. The system of clause 10, wherein the data storage element includes at least one of a flash memory drive and a computer memory card.

12. The system of any one of clauses 1 to 11, further including at least one power supply adapted to provide power at least to the controller.

13. The system of any one of clauses 1 to 12, wherein the selected challenge includes at least one of an image and a video, and the instructions to prepare the selected challenge include instructions to change a format of at least one of the image and the video.

14. The system of any one of clauses 1 to 13, wherein the selected challenge includes at least one of an image and a video, and the instructions to prepare the selected challenge include instructions to scale at least one of the image and the video.

15. The system of any one of clauses 1 to 14, wherein the selected challenge includes at least one of an image and a video, and the instructions to prepare the selected challenge include instructions to apply at least one filter to at least one of the image and the video.

16. The system of any one of clauses 1 to 15, wherein the selected challenge includes at least one of an image and a video, and the instructions to prepare the selected challenge include instructions to divide the video into individual sequential frames or images.

17. The system of any one of clauses 1 to 16, wherein the selected challenge includes at least one of an image and a video, and the instructions to prepare the selected challenge include instruction to employ image processing algorithms to compensate for at least one of optical, geometric, and chromatic distortions.

18. The system of any one of clauses 1 to 17, further including at least one audio speaker functionally associated with the controller and adapted for providing audio instructions of the selected challenge to the user, and wherein the instructions to prepare the selected challenge include instructions to prepare the audio instructions of the selected challenge for being played on the at least one audio speaker.

19. The system of any one of clauses 1 to 18, wherein the at least one crafting surface includes at least two crafting surfaces, a first of the at least two crafting surfaces being of a first type suitable for creating a first type of craft, and a second of the at least two crafting surfaces being of a second type suitable for creating a second type of craft, the first type of crafting surface being different from the second type of crafting surface.

20. The system of any one of clauses 1 to 19, wherein the at least one crafting surface includes a peg board including pegs suitable for engaging crafting pieces.

21. The system of any one of clauses 1 to 20, wherein the at least one crafting surface includes a board including bores, slots, or compartments for receiving crafting pieces.

22. The system of any one of clauses 1 to 21, wherein the at least one crafting surface includes a surface including hooks forming a loom for rubber-band, beaded, or yarn crafts.

23. The system of any one of clauses 1 to 22, wherein the at least one crafting surface includes a surface for holding at least one edge of a piece of jewelry while the piece of jewelry is being created.

24. The system of any one of clauses 1 to 23, wherein the at least one crafting surface includes a surface suitable for holding a fabric for embroidery or needlepoint.

25. The system of any one of clauses 1 to 24, wherein the at least one crafting surface includes a base surface for building blocks.

26. The system of any one of clauses 1 to 25, wherein the at least one crafting surface includes a surface for glass painting.

27. The system of any one of clauses 1 to 26, further including a secondary display surface, functionally associated with the processor and adapted for displaying instructions of the selected crafting challenge to the user when the display surface is not visible through the crafting surface.

28. The system of any one of clauses 1 to 27, further including a user interface, and wherein the storage medium of the controller further includes a UI (user interface) input analysis module including instructions to interpret input received by the user via the user interface and to change content provided to the display surface in response to the input received from the user.

29. The system of clause 28, wherein the instructions to receive a selection include instructions to receive a selection provided to the user interface by the user interacting with the user interface.

30. The system of clause 28 or clause 29, wherein the display surface is responsive to user interaction therewith, and wherein the user interface is displayed on the display surface.

31. The system of clause 28 or clause 29, wherein the user interface includes at least one physical button disposed on an exterior surface of the housing.

32. The system of any one of clauses 28 to 31, wherein the user interface includes a mechanism for navigating between crafting challenges in the crafting challenge repository.

33. The system of any one of clauses 28 to 32, wherein the user interface includes a mechanism for navigating between instructions of a crafting challenge including multiple instructions.

34. The system of any one of clauses 28 to 33, wherein the user interface includes a mechanism for navigating between steps of a crafting challenge including multiple steps.

35. The system of any one of clauses 28 to 34, wherein the user interface includes a mechanism for returning to a first step of the selected crafting challenge.

36. The system of any one of clauses 28 to 35, wherein the user interface includes a mechanism for returning to a first step of a first crafting challenge in the at least one challenge repository.

37. The system of any one of clauses 28 to 36, wherein the user interface includes a mechanism for repeating the last instruction of a crafting challenge including multiple instructions.

38. The system of any one of clauses 28 to 37, wherein the user interface includes a mechanism for repeating the last step of a crafting challenge including multiple steps.

39. The system of any one of clauses 28 to 38, wherein the user interface includes at least one visual indicator, providing at least one indication to the user regarding an action being carried out by the controller.

40. The system of any one of clauses 28 to 39, wherein the user interface includes a voice capturing element adapted to receive at least one voice command from the user.

41. The system of any one of clauses 1 to 40, further including at least one response capturing device, functionally associated with the controller, and adapted to capture a response provided by the user by capturing one or more images of at least one of the display surface, the crafting surface, a vicinity of at least one of the display surface and the crafting surface, and the user, while the user is providing a response to the selected crafting challenge, and to provide the one or more images to the controller.

42. The system of clause 41, wherein the response capturing device includes at least one of an image sensor, an image signal processor, a two-dimensional stills camera, a two-dimensional video camera, a three-dimensional stills camera, and a three-dimensional video camera.

43. The system of clause 41 or clause 42, further including a guiding system having the response capturing device mounted thereon, such that the response capturing device is movable relative to the display surface.

44. The system of any one of clauses 41 to 43, wherein the response capturing device is further adapted to transmit the one or more images to a remote location.

45. The system of any one of clauses 41 to 44, wherein the storage medium of the controller further includes a response analysis module including:

instructions to receive the one or more images captured by the response capturing device; and instructions to analyze the one or more images captured by the response capturing device so as to determine whether or not the response provided by the user the user has correctly completed the selected crafting challenge.

46. The system of clause 45, wherein the instructions to analyze include instructions for implementing at least one of a computer vision algorithm and a machine learning algorithm to compute an error function and determine whether the response provided by the user is correct.

47. The system of clause 45 or clause 46, wherein the instructions to analyze include instructions for implementing at least one algorithm for two-dimensional pattern matching.

48. The system of any one of clauses 45 to 47, wherein the instructions to analyze include instructions for implementing at least one algorithm for three dimensional depth analysis of the one or more captured images.

49. The system of any one of clauses 45 to 48, wherein the instructions to analyze include instructions to implement image processing algorithms so as to compensate for at least one of optical, geometric, and chromatic distortions arising from physical limitations of the response capturing device.

50. The system of any one of clauses 45 to 49, wherein the instructions to analyze include instructions to analyze a methodology by which the user provides the response to the crafting challenge.

51. The system of any one of clauses 45 to 50, wherein the storage medium of the controller further includes a feedback module, functionally associated with the response analysis module, and including:

instructions to receive results of an analysis conducted by the instructions to analyze; and instructions to use the received results to generate feedback for transmission to the user.

52. The system of clause 51, wherein the instructions to generate feedback include instructions to generate visual feedback, audio feedback, and tactile feedback.

53. The system of clause 51 or clause 52, wherein the instructions to generate feedback include instruction to generate feedback relating to the user's response to the selected crafting challenge.

54. The system of any one of clauses 51 to 53, wherein the instructions to generate feedback include instruction to generate feedback relating to a methodology by which the user completed the selected crafting challenge.

55. The system of any one of clauses 51 to 54, wherein the instructions to generate feedback include instruction to generate feedback relating to physical characteristics applied while the user completed the selected crafting challenge.

56. The system of any one of clauses 1 to 55, further including a secondary computing device, functionally associated with or in communication with the controller, the secondary computing device adapted to at least one of:

provide a second user interface for user interaction with the controller;

reduce load on the controller by serving for off-loading tasks from the controller 57. The system of any one of clauses 1 to 56, further including an inactivity sensing functionality adapted to identify when the system has been inactive for a predetermined duration, and to provide an indication of inactivity to the controller, and wherein the storage medium further includes instructions, to be carried out upon receive of the indication of inactivity, to for adapt operation of the controller so as to preserve power consumption by the system when it is inactive.

58. A method for guiding a user in creating a craft using a crafting system including a controller, a display surface, and at least one crafting surface, the method including:

at the controller, receiving a selection of a crafting challenge to be provided to the user;

receiving a specific crafting surface, suitable for completion of the selected crafting challenge, above the display surface, such that at least part of the display surface is visible through the specific crafting surface;

preparing at least a portion of the selected crafting challenge for provision to the user; and providing the at least a portion of the selected crafting challenge to the user by displaying instructions for completion of the at least a portion of the selected crafting challenge on the at least part of the display surface visible through the specific crafting surface.

59. The method of clause 58, wherein the receiving a selection includes having a challenge repository including a single crafting challenge associated with the controller.

60. The method of clause 58, wherein the receiving a selection includes the controller automatically selecting the crafting challenge to be provided to the user based on a user profile of the user.

61. The method of clause 58, wherein the receiving a selection includes receiving, via a networked transceiver, a selection of a specific crafting challenge selected from a challenge repository remote from the system.

62. The method of clause 58, wherein the receiving a selection includes receiving, via a user interface of the system, a user selection of a specific crafting challenge from a challenge repository functionally associated with the system.

63. The method of clause 58, wherein the receiving a selection includes generating the crafting challenge using an image capturing device associated with the controller.

64. The method of any one of clauses 58 to 63, further including, prior to the receiving the specific crafting surface includes, prompting a user to arrange the specific crafting surface above the display surface.

65. The method of any one of clauses 58 to 64, wherein the selected crafting challenge includes at least one of an image, a video clip, and audio instructions.

66. The method of any one of clauses 58 to 65, wherein the selected crafting challenge includes instructions to be mimicked by the user.

67. The method of any one of clauses 58 to 66, wherein the selected crafting challenge includes at least one image, the preparing the at least a portion includes processing of the at least one image to accommodate conditions in which the selected crafting challenge will be provided, and the providing includes displaying the at least one image following preparation thereof, on the display surface.

68. The method of any one of clauses 58 to 67, wherein the selected crafting challenge includes audio, and wherein the providing includes providing the audio associated with the selected crafting challenge to the user via a speaker.

69. The method of any one of clauses 58 to 68, wherein the selected crafting challenge includes a multi-step challenge including a plurality of steps.

70. The method of clause 69, wherein the preparing includes preparing each of the plurality of steps and the providing includes providing each of the plurality of steps to the user in sequence, without user interaction.

71. The method of clause 70, wherein the preparing each of the plurality of steps includes preparing each of the plurality of steps in advance of providing any of the plurality of steps to the user.

72. The method of clause 70, wherein the preparing each of the plurality of steps and the providing each of the plurality of steps include:
   preparing a first step of the plurality of steps;
   providing the first step to the user; and
   during or following the providing of the first step, preparing a second step of the plurality of steps, the second step being subsequent to the first step in a sequence of the plurality of steps in the selected crafting challenge.

73. The method of any one of clauses 70 to 72, wherein the providing each of the plurality of steps to the user in sequence includes providing each of the plurality of a steps to the user for a predefined duration, and then automatically and without user interaction proceeding to providing the next of the plurality of steps.

74. The method of clause 69, wherein the preparing includes preparing each of the plurality of steps in advance of providing any of the plurality of steps to the user, and the providing includes:
   providing a first step of the plurality of steps to the user;
   receiving from the user input indicating completion of the provided step; and
   providing a second step of the plurality of steps to the user, the second step being subsequent to the first step in a sequence of the plurality of steps in the selected crafting challenge.

75. The method of clause 69, wherein the preparing and the providing include:
   preparing a first step of the plurality of steps;
   providing the first step of the plurality of steps to the user;
   receiving from the user input indicating completion of the provided step;
   preparing a second step of the plurality of steps, the second step being subsequent to the first step in a sequence of the plurality of steps in the selected crafting challenge; and
   providing the second step of the plurality of steps to the user.

76. The method of any one of clauses 69 to 75, wherein at least one of the plurality of steps is provided to the user on the display surface, and at least one other of the plurality of steps is provided to the user via crafting elements placed on the display surface by the user to complete the at least one of the plurality of steps.

77. The method of any one of clauses 69 to 75, wherein at least one of the plurality of steps is provided to the user on the display surface, and at least one other of the plurality of steps is provided to the user on a secondary display surface.

78. The method of any one of clauses 58 to 77, further including capturing a response provided by the user to the at least a portion of the selected crafting challenge.

79. The method of clause 78, wherein the capturing a response includes capturing the user's response to the at least a portion of the selected crafting challenge, by capturing at least one image of at least one of the display surface, the crafting surface, a vicinity of at least one of the display surface and the crafting surface, and the user, during the user a craft created by the user based on the provided at least a portion of the selected crafting challenge.

80. The method of clause 79, further including analyzing the captured response to the at least one portion of the selected crafting challenge, so as to determine at least one of whether or not the response is correct and the response was provided in a correct manner.

81. The method of clause 80, further including, following the analyzing and based on results of the analyzing, providing feedback for the captured response.

82. The method of clause 81, wherein the providing feedback includes providing at least one of visual feedback, audio feedback, and tactile feedback.

83. The method of clause 81 or clause 82, wherein the providing feedback includes providing the feedback to the user.

84. The method of any one of clauses 81 to 83, wherein the providing feedback includes providing the feedback to a remote device via network communication with the remote device.

85. The method of any one of clauses 81 to 84, wherein selected crafting challenge is a multi-step challenge, and the capturing the response, the analyzing, and the providing feedback are carried out following user completion of each step in the multi-step challenge.

86. The method of any one of clauses 81 to 84, wherein the capturing the response, the analyzing, and the providing feedback are carried out only following user completion of the entire crafting challenge.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification, including U.S. Pat. No.

9,740,379, are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A crafting system for guiding a user in creating a craft, the system comprising:
    at least one crafting challenge repository storing a plurality of crafting challenges, each including instructions for creating a specific craft;
    a display surface adapted to have one or more said crafting challenges displayed thereon;
    a controller including:
        a processor functionally associated with said crafting challenge repository and with said display surface; and
        a non-transitory computer readable storage medium storing software modules including instructions to be executed by said processor, said non-transitory computer readable storage medium having stored:
            instructions to receive a selection of a selected crafting challenge to be displayed on said display surface; and
            a challenge preparation module including instructions to prepare a selected challenge for display on said display surface and to provide said prepared challenge to said display surface for display thereon;
    a housing accommodating at least said controller; and
    at least two at least partially transparent crafting surfaces, each adapted to be removably mounted above said display surface such that when instructions of said prepared challenge are displayed on said display surface, said instructions are visible to the user through said crafting surface, a first of said at least two crafting surfaces being of a first type suitable for creating a first type of craft, and a second of said at least two crafting surfaces being of a second type suitable for creating a second type of craft, said first type of crafting surface being different from said second type of crafting surface.

2. The system of claim 1, wherein said display surface, said housing, and said controller form part of a computing device, which computing device comprises at least one of a laptop computer, a tablet computer, and a smartphone.

3. The system of claim 1, wherein said display surface is external to said housing and is in operative communication with said controller.

4. The system of claim 1, wherein said at least one crafting challenge repository comprises at least one of:
    a remote crafting challenge repository located remotely from said housing, and in communication with said controller via a transceiver;
    an integral challenge repository accommodated within said housing; and
    a removable crafting challenge repository stored on a data storage element adapted to be functionally associated with said controller by insertion of said data storage element into a suitable port in said housing.

5. The system of claim 1, further including at least one audio speaker functionally associated with said controller and adapted for providing audio instructions of said selected challenge to the user, and wherein said instructions to prepare said selected challenge include instructions to prepare said audio instructions of said selected challenge for being played on said at least one audio speaker.

6. The system of claim 1, further including a secondary display surface, functionally associated with said processor and adapted for displaying instructions of said selected crafting challenge to the user when said display surface is not visible through said crafting surface.

7. The system of claim 1, further comprising at least one response capturing device, functionally associated with said controller, and adapted to capture a response provided by the user by capturing one or more images of at least one of said display surface, said crafting surface, a vicinity of at least one of said display surface and said crafting surface, and the user, while the user is providing a response to said selected crafting challenge, and to provide said one or more images to said controller.

8. The system of claim 7, wherein said storage medium of said controller further includes a response analysis module including:
    instructions to receive said one or more images captured by said response capturing device; and
    instructions to analyze said one or more images captured by said response capturing device so as to determine whether or not said response provided by the user has correctly completed said selected crafting challenge.

9. The system of claim 8, wherein said instructions to analyze include at least one of:
    instructions for implementing at least one of a computer vision algorithm and a machine learning algorithm to compute an error function and determine whether said response provided by the user is correct;
    instructions for implementing at least one algorithm for two-dimensional pattern matching;
    instructions for implementing at least one algorithm for three dimensional depth analysis of the one or more captured images;
    instructions to implement image processing algorithms so as to compensate for at least one of optical, geometric, and chromatic distortions arising from physical limitations of said response capturing device; and
    instructions to analyze a methodology by which the user provides said response to said crafting challenge.

10. The system of claim 8, wherein said storage medium of said controller further comprises a feedback module, functionally associated with said response analysis module, and including:
    instructions to receive results of an analysis conducted by said instructions to analyze; and
    instructions to use said received results to generate feedback for transmission to the user.

11. The system of claim 1, further comprising a secondary computing device, functionally associated with or in communication with said controller, said secondary computing device adapted to at least one of:
    provide a second user interface for user interaction with said controller;
    reduce load on said controller by serving for off-loading tasks from said controller.

12. A crafting system for guiding a user in creating a craft, the system comprising:
    at least one crafting challenge repository storing a plurality of crafting challenges, each including instructions for creating a specific craft;
    a display surface adapted to have one or more said crafting challenges displayed thereon;

a controller including:
- a processor functionally associated with said crafting challenge repository and with said display surface; and
- a non-transitory computer readable storage medium storing software modules including instructions to be executed by said processor, said non-transitory computer readable storage medium having stored:
  - instructions to receive a selection of a selected crafting challenge to be displayed on said display surface; and
  - a challenge preparation module including instructions to prepare a selected challenge for display on said display surface and to provide said prepared challenge to said display surface for display thereon;

a housing accommodating at least said controller;

at least one at least partially transparent crafting surface, adapted to be removably mounted above said display surface such that when instructions of said prepared challenge are displayed on said display surface, said instructions are visible to the user through said crafting surface; and a secondary display surface, functionally associated with said processor and adapted for displaying instructions of said selected crafting challenge to the user when said display surface is not visible through said crafting surface.

13. The system of claim 12, wherein said display surface, said housing, and said controller form part of a computing device, which computing device comprises at least one of a laptop computer, a tablet computer, and a smartphone.

14. The system of claim 12, wherein said display surface is external to said housing and is in operative communication with said controller.

15. The system of claim 12, further including at least one audio speaker functionally associated with said controller and adapted for providing audio instructions of said selected challenge to the user, and wherein said instructions to prepare said selected challenge include instructions to prepare said audio instructions of said selected challenge for being played on said at least one audio speaker.

16. The system of claim 12, wherein said at least one crafting surface comprises at least two crafting surfaces, a first of said at least two crafting surfaces being of a first type suitable for creating a first type of craft, and a second of said at least two crafting surfaces being of a second type suitable for creating a second type of craft, said first type of crafting surface being different from said second type of crafting surface.

17. The system of claim 12, further comprising at least one response capturing device, functionally associated with said controller, and adapted to capture a response provided by the user by capturing one or more images of at least one of said display surface, said crafting surface, a vicinity of at least one of said display surface and said crafting surface, and the user, while the user is providing a response to said selected crafting challenge, and to provide said one or more images to said controller.

18. The system of claim 17, wherein said storage medium of said controller further includes a response analysis module including:
- instructions to receive said one or more images captured by said response capturing device; and
- instructions to analyze said one or more images captured by said response capturing device so as to determine whether or not said response provided by the user the user has correctly completed said selected crafting challenge.

19. The system of claim 18, wherein said storage medium of said controller further includes a feedback module, functionally associated with said response analysis module, and including:
- instructions to receive results of an analysis conducted by said instructions to analyze; and
- instructions to use said received results to generate feedback for transmission to the user.

20. The system of claim 12, further comprising a secondary computing device, functionally associated with or in communication with said controller, said secondary computing device adapted to at least one of:
- provide a second user interface for user interaction with said controller;
- reduce load on said controller by serving for off-loading tasks from said controller.

* * * * *